(12) United States Patent
Poulakis

(10) Patent No.: US 6,468,371 B1
(45) Date of Patent: Oct. 22, 2002

(54) METHOD FOR PRODUCING A MOULDED PART, ESPECIALLY A SHEET MEMBER FOR A CAR OR PLANE PASSENGER SEAT

(75) Inventor: Konstantinos Poulakis, Pulsnitz (DE)

(73) Assignee: Gottleib Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 09/600,584
(22) PCT Filed: Nov. 12, 1998
(86) PCT No.: PCT/EP98/07240
§ 371 (c)(1),
(2), (4) Date: Jul. 19, 2000
(87) PCT Pub. No.: WO00/29189
PCT Pub. Date: May 25, 2000

(51) Int. Cl.$^7$ ............................................. B32B 31/00
(52) U.S. Cl. .................... 156/66; 156/245; 264/271.1; 264/278
(58) Field of Search ............... 156/66, 91, 92, 156/245; 264/259, 271.1, 278; 24/442; 428/100

(56) References Cited

U.S. PATENT DOCUMENTS 4,617,214 A * 10/1986 Billarant ..................... 24/306
5,286,431 A * 2/1994 Banfield et al. ............ 264/134
5,654,070 A   8/1997 Billarant ..................... 428/100

FOREIGN PATENT DOCUMENTS

EP         0 612 485 A1    8/1994

* cited by examiner

Primary Examiner—Michael W. Ball
Assistant Examiner—Gladys Piazza
(74) Attorney, Agent, or Firm—Roylance, Abrams, Berdo & Goodman, L.L.P.

(57) ABSTRACT

A method for the production of a molded part, particularly of a shell part for a motor vehicle or aircraft passenger seat, uses plastic material and a mold acted upon with a working pressure. A receiving part receives an adhering part being molded to the molded part, and is embedded with adhering elements found on a support. The adhering part is supported against the effect of the working pressure generated during the molding process by a barbed hook surface arranged in the receiving part. The hooked surface is formed by a plurality of projecting barbed hooks, engaged in the intermediate spaces between the adhering elements of the adhering part such that the support is placed on the points of the barbed hooks.

15 Claims, 2 Drawing Sheets

US 6,468,371 B1

METHOD FOR PRODUCING A MOULDED PART, ESPECIALLY A SHEET MEMBER FOR A CAR OR PLANE PASSENGER SEAT

FIELD OF THE INVENTION

The present invention relates to a method for the production of a molded part, especially a shell part for shaping a motor vehicle or aircraft passenger seat, using plastic material and a mold having a receiving part which can be acted upon with a working pressure sufficient for a molding process. An adhesive closing part or adhering strip or part to be molded onto the contour of the molded part is embedded in the mold with adhering elements on a support.

BACKGROUND OF THE INVENTION

Conventional methods forming a molded part with an adhering strip, similar for example to EP 0 612 485 A1, lead to certain presumable results when the relevant molding process can be executed using low working pressures. This is the situation when, for example in the case of molded parts, foam material parts are involved, possibly upholstery foam material parts for seats. The molding process is carried out by feeding a soft foam into a foam mold, which can occur with comparatively low injection pressures. The adhesive closing part or adhering strip being formed by being shaped with and on the molded part during the molding process remains under the effect of only moderate working pressure.

If, on the other hand, molding processes are to be carried out which necessitate higher working pressures, such as is the case for example with the production of hard seat shells or shell parts which are produced of hard foam materials, working pressures on the order of approximately 5 to 10 bar pressure are required. Such pressure involves hard pressing, even crushing, of the adhering part found in the receiving part, leading to defective foam formation, for example, leading to the foam not conforming to the contour of the adhering part on the surface of the molded part, or leading to pervasive crushing of the adhering elements. These problems arise progressively more often the higher the working pressures, as is for example the case during molding processes by injection molding or with the processing of so-called prepregs or pre-impregnated parts. At those pressures, the molding process is carried out by pressing a respective resin mat suitable for the purpose into a hot molding arrangement, with pressures of between 30 and 150 bar. Because of the stresses arising from this process, for a long time it has no longer been possible during the molding process to laminate adhering parts onto the relevant molded part.

SUMMARY OF THE INVENTION

Objects of the present invention are to provide a method allowing shaping and molding of adhering parts onto a molded part, even when very high working pressures are required during the molding process.

The foregoing objects are provided according to the present invention with a method in which adhering part is supported against the effect of the working pressure during the molding process by a barbed hook surface arranged in the receiving part for the adhering part. The surface is formed by a plurality of projecting barbed hooks engaged in the intermediate spaces between the adhering elements of the adhering part in such a manner that its support member is placed against the points of the barbed hooks.

The barbed hooks engage between the adhering elements and together form a contact surface. The local surface pressure, as compared with the support of the adhering part, remains comparatively low because of the great plurality of points involved, even with application of greater pressure because of high working pressures. The support effect is then approximately comparable with the distribution of support in the case of a so-called bed of nails on account of the great number of points. A heavy body can be borne securely by the extensive surface contact. Since the points engage in the intermediate spaces between the adhering elements, the support occurs without danger of deformation of the adhering elements.

The barbed hook surface can be formed by a sort of scratching strip embedded in the receiving part of the relevant mold. Such scratching strip is made of a flat textile material having a plurality of U-shaped metal wires anchored therein. The wires are of high-grade steel. The open ends of the U-shaped wires in turn form the barbed hooks. The closed ends of the U-shaped wires form the anchoring parts within the flat textile material. The flat textile material can also involve a similar material, such as disclosed in DE 296 11 207 U1. In other words, it may be a material compound of multiple layers of cotton and heat-resistant polyamide, commercially available under the name "NOMEX."

The supporting of the adhering part in the receiving part of the mold as provided in the present invention facilitates problem-free production of seat shells, shell parts or any other type of articles of hard foam having adhering parts or strips embedded in foam on the surface of the relevant fixture. Since the method according to the present invention can involve high working pressures, practically all available foamable materials can be processed. Additive materials can also be included, possibly barium sulfate (pearl white foam or artificial barium sulfate). Foaming processes can also be carried out with fiber reinforcements embedded in the respective foam mold.

One particular advantage of the present invention resides in that injection molded parts can also be produced with the adhering part spray-molded on the surface. Also, molded parts can be in the form of laminates. The method according to the present invention can be carried out, for example, with use of polyurethane-prepregs. A hot mold tool is used as a mold, having receiving part incorporating the barbed hook surface and embedding the adhering part. The respective resin mat is pressed into the mold tool serving as a mold at 130 to 150° C., with working pressures of between 30 and 150 bar.

With performing the method using flowable plastic materials, the adhering part is preferably provided with a covering during the molding process to prevent the admission of plastic material into the adhesive elements. When the processing involves foamable plastic materials, it is preferably carried out in such a manner that a covering, which prevents the formation of foam, is arranged on the opposite side from the adhering elements. A predeterminable edge width of the covering projects out over the surface area of the adhering elements. The covering is connected with the support of the adhering part by adhesive and as a holding device for detachably contacting at least the parts of the foam mold surrounding the receiving part. When the covering is provided with ferromagnetic components, and magnetic field-producing devices, for example in the form of permanent magnet strips, are mounted on corresponding surface areas of the foam mold, the edges of the covering, which prevent the formation of foam projecting over the surface area of the adhering elements, in turn establish a part of a magnetic holding device for the tight and secure fitting of the adhering part to the foam mold.

As a covering which prevents the formation of foam, a fleece material with uncrosslinked polyurethane and with addition of ferromagnetic particles can be adhered with the side of the support turned away from the adhering elements. During the foaming process the plastic material, in the form of hard or soft foam, penetrates and comes into the structure of the fleece, so that it becomes an integral part of the fleece.

When a heat-reacting adhesive is used to fasten the fleece covering to the support of the adhering part, it is advantageous to process it in such a manner that the adhering part first is arranged without any covering which prevents the formation of foam on the barbed hook surface in the receiving part of the foam mold. Then, when reactant adhesive is found on the support of the adhering part or on the inner surface of the fleece covering, the fleece covering is laid out on the support of the adhering part in such a manner that the projecting edges of the fleece covering adhere magnetically to the foam mold. The foaming process is then carried out and the adhesive thereby is activated simultaneously by the heat being generated during the foaming process. Following termination of the foaming process and release of the adhering part from the mold, the adhering part becomes securely adhered with the fleece covering which has been foamed up in the mold part.

Objects of the present invention also include providing a molded part produced according to the method of the present invention, especially in the form of a hard shell part for a vehicle or aircraft passenger seat, with an adhering part, of which the adhesive elements are exposed in a surface of the molded part.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
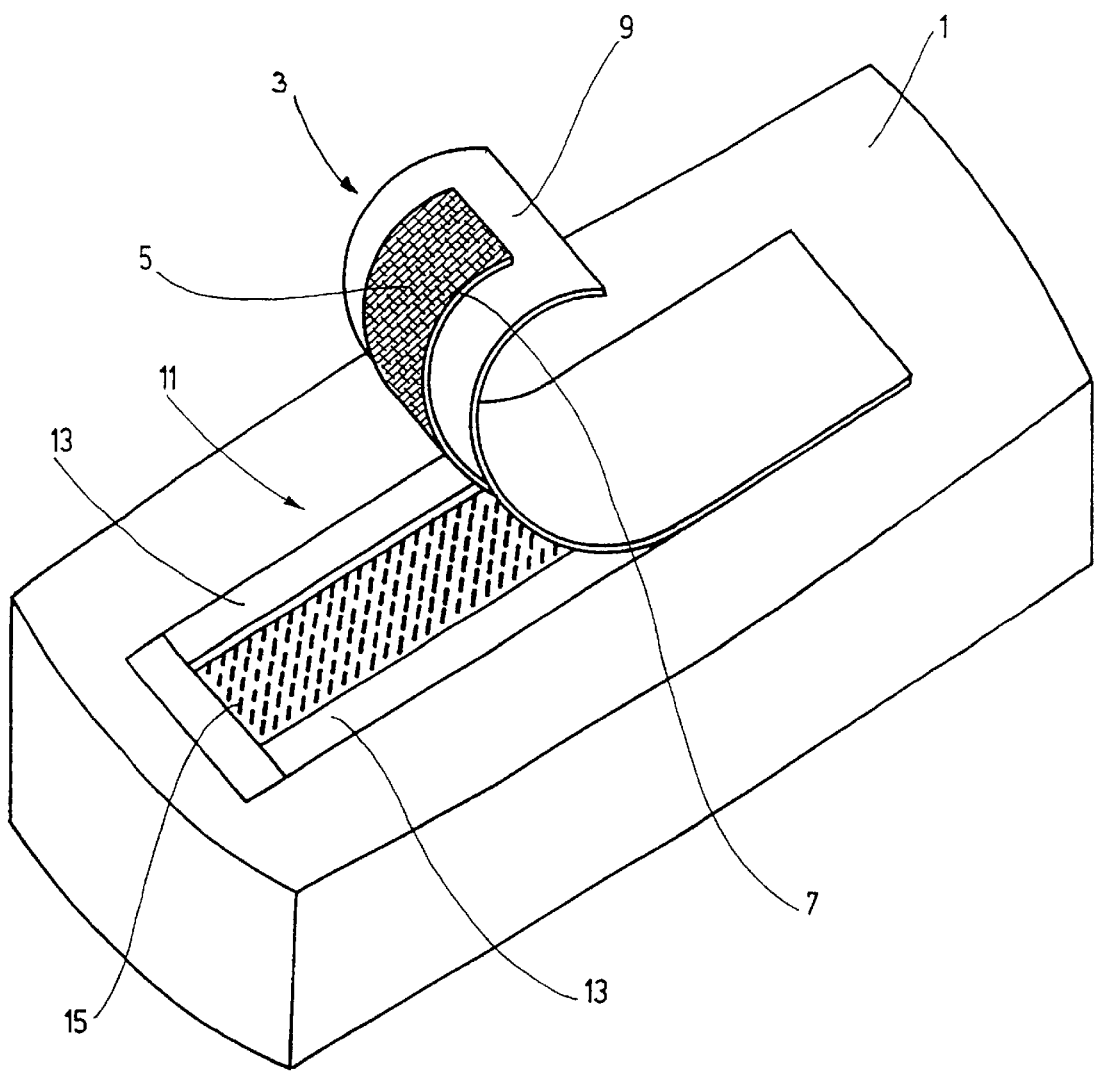
FIG. 1 is a diagrammatic perspective view of a foam mold according to a first embodiment of the present invention.

FIG. 1 shows that portion of a foam mold 1 forming a channel and projecting into the interior of the mold hollow space. A depression is formed in the molded part formed during the foaming process. The mechanically adhering closing strip or part, indicated in its entirety with 3, is to be embedded in the base of this depression by foaming into the surface of the molded part in such a manner that the mechanically adhering closing elements 5 of adhering part 3 are exposed. The adhering elements are molded onto the front of a support 7 in the traditional manner, and are in the form of stalks with barbed hooks at the ends or having end thicknesses in the form of mushroom-shaped or plate-like heads. Such adhering parts are disclosed in DE 198 46 318 A1.

With the exemplary embodiment illustrated in FIG. 1, a fleece material 9 serves as a covering for preventing the formation of foam. The fleece material is adhered to support 7 on the side of support 7 opposite adhering elements 5. The fleece material 9 is apportioned and shaped so that it projects outwardly on all sides, with a certain edge width over the surface area of adhering elements 5. Also, fleece material 9 is provided with a coating of uncrosslinked polyurethane, for example a polyurethane as it is commercially distributed under the name SU-9182 of the Firma Stahl. The coating contains additives in the form of iron particles of granular dimensions of less than 10 microns as ferromagnetic material.

Foam mold includes a receiving part 11 on which can be constructed the adhering part 3 for the foam-molding process. The edges of receiving part 11 are surrounded by magnetic strips 13. When adhering closing part 3 is mounted in position on receiving part 11, the projecting edges of fleece material 9, because of their ferromagnetic property, together with the magnetic strips 13 form a holding arrangement holding adhering part 3. Simultaneously the fleece material 9, by its edge contact on magnetic strips 13, forms a covering which prevents the admission of foam material into adhering elements 5 during the foaming process.

The side of receiving part 11 turned toward or facing adhering elements 5 forms a support arrangement for adhering part 3, supporting it against the force of pressure engaging thereon with application of the pressure corresponding to injections. The support effect occurs by means of a barbed hook surface formed by a scratching strip 15 having erect barbed hooks. Scratching strip 15 has a flat textile material on its reverse side, in which is anchored a plurality of U-shaped metal wires. The open ends of each U-shape form barbed hooks projecting out of the flat material. The barbed hooks, which for clarity are represented in FIG. 1 in a smaller number and with greater thickness than in the practical embodiment. In the actual embodiment the barbed hooks are provided in great multitude and are configured to be of such fine dimensions that when adhering part 3 is placed thereon, the barbed hooks enter into the intermediate spaces between adhering elements 5. The points of the barbed hooks come into contact, like a bed of nails, with support 7 of adhering part 3. In this manner, adhering part 3 is securely supported during the foaming process. With use of a hard foam part 3 can resist pressures on the order of approximately 10 bar, so that no impairment of adhering elements 5 is to be feared.

Figure 2:
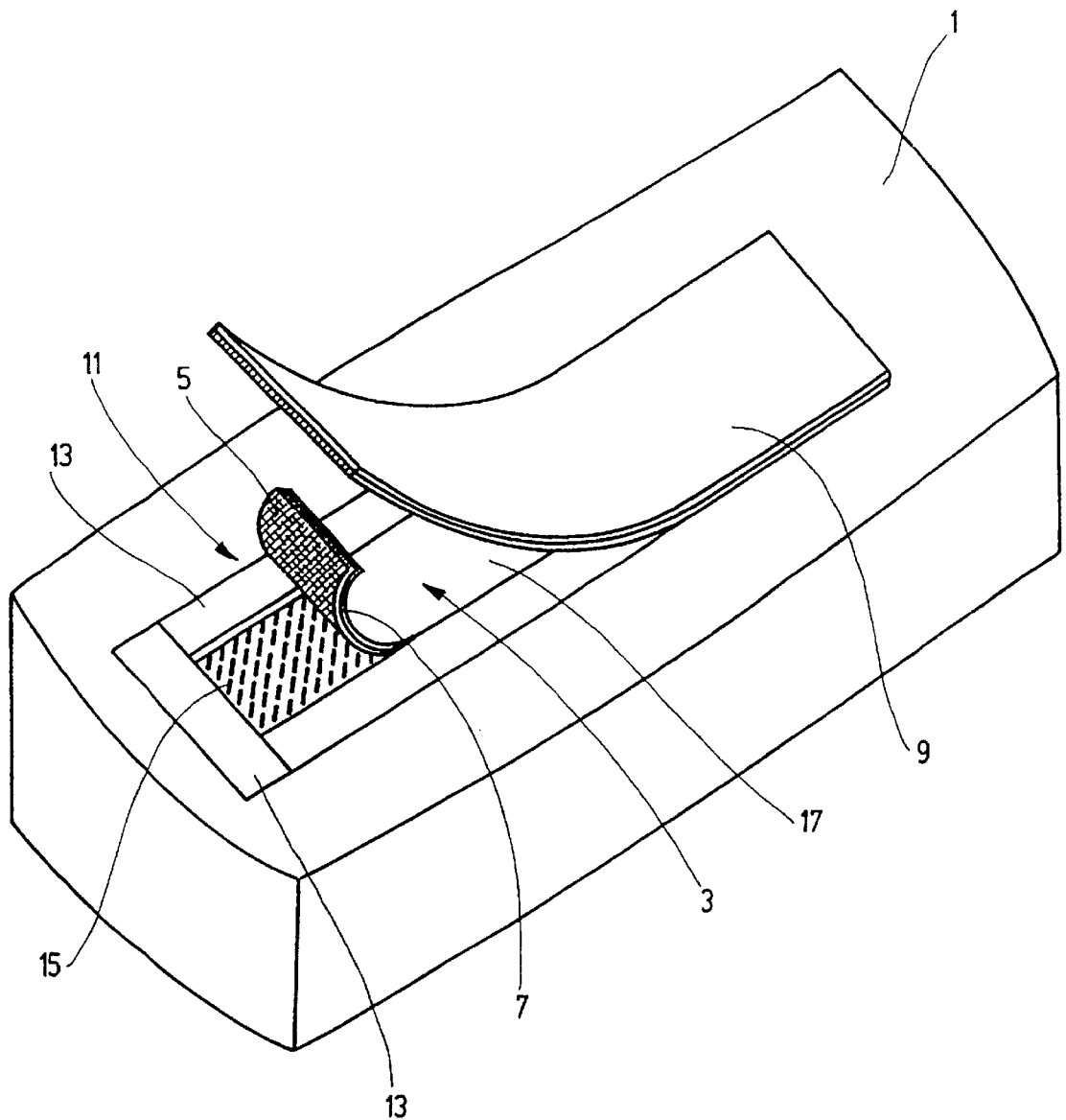
FIG. 2 is a diagrammatic perspective view of a mold according to a second embodiment of the present invention.

The embodiment shown in FIG. 2 differs form the first embodiment in that adhesive closing part or adhering part or strip 3 is brought into position in receiving part 11 of foam mold 1 without first having fleece material 9 applied to support 7. However, on the reverse side of support 7 facing away from adhering elements 5, adhering part 3 has a layer of a heat-reactive adhesive material 17. In this case, either an adhesive made up of a nitrile-rubber base or a polyamide adhesive can be used. For this purpose, it is suitable among other things to use an adhesive commercially available under the name BOSTIK 1475.

Fleece material 9, relative to its dimensions and its ferromagnetic properties, is configured to be identical to that used in the first embodiment, and is applied following the engagement of adhering part 3 on receiving part 11. With the foaming and embedding process occurring thereafter, in which the temperature of the plastic material is in the range of 140° C., the adhesive 17 is brought to reaction. With the foaming and embedding process therefore not only is fleece material 9 foamed on the surface of the molded part which is being formed, but simultaneously its permanent connection with adhering part 3 is produced by adherence. Fleece material 9, because of the adherence to the edges of receiving part 11, an adherence caused by magnetic force on the edges, covers the area of the adhering elements 5 to protect them against penetrating foam.

While various embodiments have been chosen to illustrate the invention, it will be understood by those skilled in the art that various changes and modifications can be made therein without departing from the scope of the invention as defined in the appended claims.

What is claimed is:

1. A method for producing a molded part with a mechanically adhering closing strip, comprising the steps of:

placing a mechanically adhering closing strip in a receiving part of a mold for forming the molded part;

supporting the mechanically adhering closing strip against effects of working pressure in the mold during molding processing on a barbed hook surface arranged in the receiving part, the mechanically adhering closing strip having a support and mechanically adhering closing elements extending therefrom, the barbed hook surface being formed of a plurality of barbed hooks engaged in intermediate spaces between the mechanically adhering closing elements of the mechanically adhering closing strip such that the support is laid out on points of the barbed hooks; and molding plastic molding material under the working pressure in the mold and against the mechanically adhering closing strip to mold the molded part with the mechanically adhering closing strip attached thereto.

2. A method according to claim 1 wherein the molded part is a motor vehicle seat.

3. A method according to claim 1 wherein the molded part is an aircraft seat.

4. A method according to claim 1 wherein a polyurethane-prepreg is inserted into the mold to form the molded part; and the mechanically adhering closing strip is applied to the molded part by lamination.

5. A method according to claim 1 wherein the mechanically adhering closing strip is placed in the receiving part of an injection mold; and the plastic molding material is spray-injected into the injection mold to produce an injection molded part with the mechanically adhering closing strip.

6. A method according to claim 1 wherein the mechanically adhering closing strip is placed in the receiving part of a foam mold; and foamable plastic material is spray-injected into the foam mold to form a foam plastic part with the mechanically adhering closing strip.

7. A method according to claim 1 wherein the mechanically adhering closing strip is coupled to a covering preventing admission of plastic material into the mechanically adhering closing elements.

8. A method according to claim 7 wherein the covering is mounted on a side of the mechanically adhering closing strip opposite the adhering elements, projects outwardly with a predeterminable edge width over a surface area of the mechanically adhering closing elements, is connected with the support of the mechanically adhering closing strip by adhesive, and is retained by a holding device into detachable contact with parts of the mold surrounding the receiving part.

9. A method according to claim 8 wherein the covering comprises ferromagnetic components attached to magnetic field-producing elements arranged on the mold such that edges of the covering projecting over the mechanically adhering closing elements are held during a foaming process.

10. A method according to claim 6 wherein the plastic material is a hot hard foam.

11. A method according to claim 10 wherein a fiber reinforcement is embedded in the mold and is foamed into the plastic molding material.

12. A method according to claim 7 wherein the covering is a fleece applied to the support.

13. A method according to claim 12 wherein the support of the mechanically adhering closing strip comprises a heat-reactive adhesive on a side of the support facing the fleece;

the mechanically adhering closing strip is arranged in the receiving part and then the fleece is subsequently applied and adjoined thereto; and connection of the mechanically adhering closing strip and fleece is caused by heat generated during a foaming process causing reaction of the adhesive.

14. A method according to claim 13 wherein the adhesive has a nitrile rubber base or is a polyamide adhesive.

15. A method according to claim 1 wherein the barbed hook surface comprises a flat, textile material with a plurality of U-shaped metal wires anchored therein, open ends of the U-shaped metal wires forming the barbed hooks, closed ends of the U-shaped metal wires forming anchorings in the textile material.

* * * * *